July 23, 1957 E. W. BAGGOTT 2,799,970
COUPLING
Filed Jan. 24, 1956
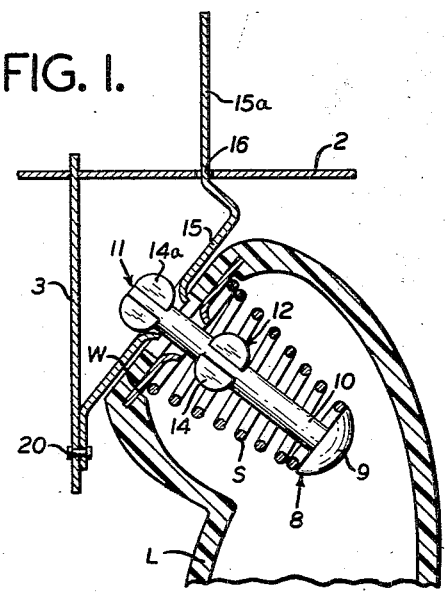
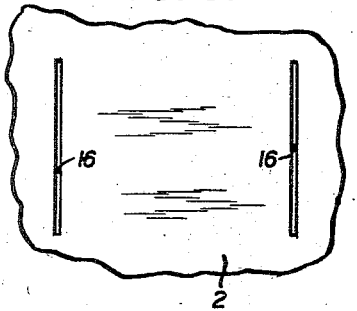
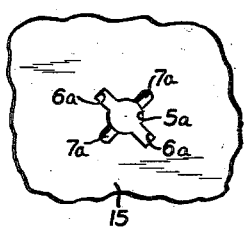
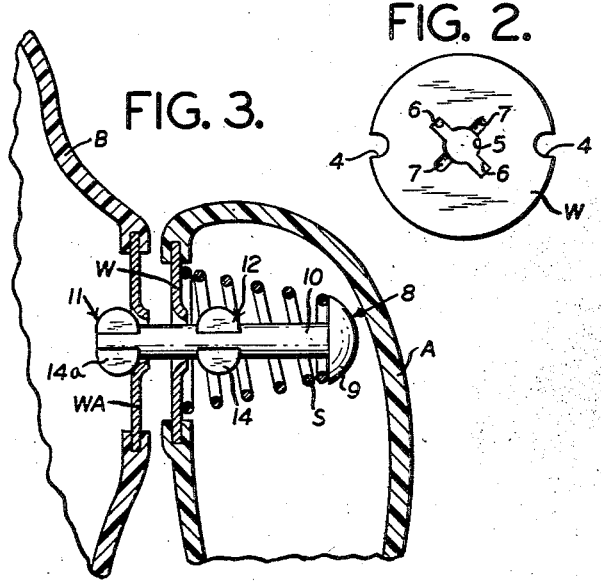
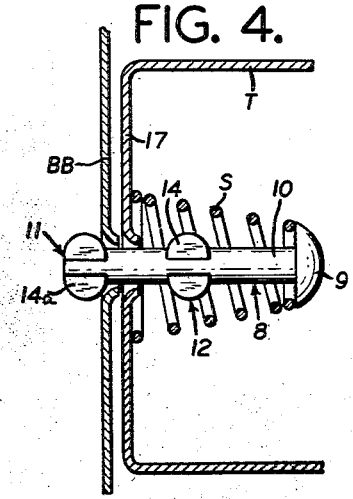
INVENTOR
EDMUND W. BAGGOTT
BY Mock & Blum
ATTORNEYS.

2,799,970
COUPLING

Edmund W. Baggott, Hollis, N. Y., assignor to Ideal Toy Corporation, Hollis, N. Y., a corporation of New York Application January 24, 1956, Serial No. 561,039

5 Claims. (Cl. 46—149)

My invention relates to a new and improved coupling for turnably connecting two members to each other, and to a novel assembly of two connected members. For convenience, one of these members is designated as the body member, and the other member is designated as the auxiliary member. For example, the body member may be the body of a doll and the auxiliary member may be the limb of a doll.

According to my invention, I provide a coupling which can be manufactured at low cost and the members can be easily assembled and disassembled.

My invention is further explained in the annexed description and drawings which illustrate preferred embodiments thereof.

Fig. 1 is a detail sectional view which shows the use of the improved coupling for connecting the leg of a doll, to connecting members which can be connected to the body of a doll. In this embodiment, the legs of the doll have a walking movement.

Fig. 2 is a plan view of the leg-washer shown in Fig. 1.

Fig. 3 is a detail sectional view which shows the arm of a doll connected to the body thereof.

Fig. 4 is a sectional view of another embodiment.

Fig. 5 is a detail plan view of one of the plates shown in Fig. 1.

Fig. 6 is a detail plan view of another of the plates shown in Fig. 1.

Fig. 3 shows the arm pulled away from body B, for convenience of illustration.

FIGS. 1, 2, 5, 6

This embodiment shows a rigid plate 2 which can be fixed rigidly to the inner wall of the hollow doll body (not shown in Fig. 1). This doll body may be rigid. This plate 2 is perpendicular to the vertical axis of the body of the doll. For convenience, this plate 2 is shown in the horizontal position. As shown in Fig. 5, said horizontal plate 2 has parallel transverse slots 16, which are closed at their ends. A vertical plate 3 is fixed either rigidly or with a slight tilting movement to plate 2. A rigid body-plate 15 is turnably connected by a pivot 20 to the vertical plate 3. This body-plate 15 optionally has the angular shape shown in Fig. 1. Said plates 2, 3, 15 and the pivot 20, are located in the hollow doll-body. Said body-plate 15 has an extension 15a, which is movable transversely back-and-forth in the respective slot 16, when plate 15 is turned around its pivot 20. When this is done in the final assembly, each leg L turns back-and-forth in unison with its respective plate 15 around pivot 20, in order to simulate a walking movement. Fig. 1 shows the connection of only one of the legs L to the body of the doll by means of the plates 2, 3 and 15 and the improved coupling. The connection is identical for both of the legs L. For convenience, the plate 3 is designated as the second body-plate and the plate 2 is designated as the third body-plate, in order to distinguish from the body-plate 15 which is coupled to the coupling-plate or washer W.

Both the body of the doll and the legs L may be made of a rigid plastic. The legs L can be wholly originally molded from a suitable plastic in two vertical and equal halves, which can be cemented to each other along their vertical edges.

The rigid coupling plate or disc-washer W, which is shown in Fig. 2, has peripheral recesses 4. The initially molded halves of leg L are provided with respective grooves, thus providing a complete groove in the assembled leg L, in which the coupling plate or washer W is seated in fixed position relative to leg L. These initially molded halves of the leg L have respective lugs which enter the respective peripheral recesses 4 of the coupling plate or washer W, thus preventing the coupling plate or washer W from turning or moving in any direction relative to the assembled leg L.

As shown in Fig. 2, the coupling plate or washer W has a central through-and-through cylindrical bore 5. This bore 5 has straight slot-extensions 6, which are located along a single respective diameter of said coupling plate or washer W. These slot-extensions 6 provide key-slots. As also shown in Fig. 2, the washer W is provided with indentations or recesses 7 which are located along a single respective diameter of said washer W. In this embodiment, but without limitation thereto, the diameter on which the indentations or recesses 7 are located, is perpendicular to the diameter along which the key-slots 6 are located.

As shown in Fig. 6, the body-plate 15 has a bore 5a which is identical with bore 5; key-slots 6a which are identical with key-slots 6; and recesses or indentations 7a which are identical with recesses 7.

These key-slots 6 and 6a may or may not be alined axially relative to the axis of the cylindrical shank 10 of bolt 8 which serves as a pivot member or bearing member for the coupling plate or washer W. Similarly, the recesses 7 and 7a may or may not be thus axially alined.

Said bolt 8 has a head 9 which is designated as an abutment-head; and an axial cylindrical shank 10 which is integral with an end key-head 11 and with an intermediate key-head 12. The end key-head 11 is identical with the intermediate key-head 12. The end key-head 11 has a pair of flattened lugs 14a and the intermediate key-head 12 has a pair of flattened lugs 14. Each lug 14 of the intermediate key-head 12 is optionally axially alined with a respective lug 14a of the end key-head 11.

The coupling includes a helical spring S, which has coils that increase progressively in diameter from the small end of said spring S to its large end. The lugs 14a of the end key-head 11 and the lugs 14 of the intermediate key-head 12 are dimensioned so that they can pass through the small end of spring S. In the final assembly shown in Fig. 1, the small end of the spring S abuts the proximate planer face of the abutment head 9, and the spring S is maintained under compression.

The washer W, the bolt 8 and the spring S form a sub-assembly or sub-unit.

This sub-assembly between washer W, bolt 8 and spring S, is made before the washer W is fixed to the two halves of the leg L.

Assembling washer W and bolt 8

In order to make this sub-assembly, the end key-head 11 and the intermediate key-head 12 are passed through the small end of the spring S. Said small end of spring S abuts the proximate planar face of the abutment-head 9 which is larger than the small end of spring S. Said end key-head 11 and said intermediate key-head 12 are also passed successively through the key-slots 6 of the washer W, thus compressing spring S between washer W and the abutment head 9 of bolt 8. The bolt 8 is then turned around the axis of its cylindrical shank 10, until the lugs 14 of the intermediate key-head 12 are seated in the indentations or depressions 7 of the washer W. This results in keeping the spring S compressed between the abutment head 9 and the washer W.

In this sub-assembly, the lugs 14 of the intermediate key-head 12 fit sufficiently closely in the recesses of washer W, so that this sub-assembly is maintained, unless the bolt 8 is turned under sufficient force relative to washer W. The recesses 7 of washer W are slightly tapered, so that the lugs 14 of the intermediate key-head 12 can be unseated from said recesses 7 and said lugs 14 can be alined with the key-slots 6 of washer W, by exerting a sufficient turning force on bolt 8 relative to washer W.

Similarly, the lugs 14a of the end key-head 11 fit sufficiently closely in the recesses 7a of plate 15, so that when the lugs 14a are seated in recesses 7a, it requires a sufficient turning force on bolt 8 to aline the lugs 14a with the key slots 6a.

After the sub-assembly of washer W, bolt 8 and spring S has been made, the washer W is fixed to the two halves of leg L, which are cemented or otherwise fixed to each other. At this stage, the bolt 8 is not turnable relative to leg L, because the lugs 14 of the intermediate key-head 12 remain seated in the recesses 7 of washer W. At this stage, the end key-head 11 extends beyond the washer W.

*Assembling the coupling and leg L with body-plate 15*

The body of the doll, like the leg L, can be initially molded or otherwise manufactured in two vertical halves. These body-halves are assembled with plates 2, 3 and 15, after plates 3 and 15 have been connected by pivot 20. These body-halves are then cemented or otherwise fixed to each other, so that the plate 2 is fixed rigidly to the body, the plate 3 is fixed rigidly or substantially fixed rigidly to plate 15, and the pivot 20 is located in the interior of said assembled body.

Each plate 15 has a limited back-and-forth transverse turning movement around pivot 20, while its extension 15a is guided slidably in the respective transverse slot 16.

It is well-known, in a walking movement, to couple the extensions 15a to each other so that plates 15 turn in opposite directions around their common pivot 20, so that this detail is not illustrated.

While the lugs 14 remain seated in recesses 7, the leg L is manipulated in unison with its bolt 8, in order to pass the lugs 14a of the end key-head 11 through the key-slots 6a of plate 15.

After the lugs 14a of the end key-head 11 have been passed through the key-slots 6a of plate 15, and while the lugs 14 of the intermediate key-head 11 remain seated in the recesses 7 of washer W, the leg L is turned in unison with bolt 8, until the lugs 14a of the end key-head 11 are seated in the recesses 7a of plate 15.

The leg L is then pulled slightly away from plate 15, thus keeping the lugs 14a of the end key-head 11 firmly seated in recesses 7a of plate 15. The leg L and its washer W are then turned in unison relative to bolt 8, which remains non-turnably held to plate 15 by lugs 14a of the end key-head 11 and recesses 7a of plate 15, until the lugs 14 of the intermediate key-head 12 are alined with the key-slots 6 of washer W. The compressed spring S then automatically passes the lugs 14 of the intermediate key-head 12 through the key-slots 6 of washer W, while the lugs 14a of the key-head 11 remain seated in the recesses 7a of plate 15.

The spring 5, which is under permanent compression in the assembly of Fig. 1 of the end key-head 11, keeps the lugs 14a normally seated in recesses 7a of plate 15, and also normally frictionally keeps the inner end of leg L against plate 15. This normal friction is sufficient to cause leg L and plate 15 to turn normally in unison around the pivot 20 which connects plates 3 and 15.

It is a well-known expedient in a walking doll to provide the plate 15 and the inner end of leg L with respective interfitting notches and lugs, in order to releasably connect plate 15 and leg 11, so that they normally turn in unison around pivot 20. Thus, plate 15 can be provided with a lug which fits in a recess or notch at the inner end of leg L. The compressed spring S keeps such lug in said recess. However, by slightly pulling leg L away from plate 15, said lug can be released from said recess or notch, so that leg L can be turned around the axis of the cylindrical shank 10 of bolt 8. Also by turning leg L under sufficient force relative to body-plate 15, such lug and notch can be disengaged from each other.

Also, if there is only a frictional engagement between plate 15 and the inner end of leg L, said frictional engagement can be released by pulling leg L slightly away from plate 15, thus permitting leg L to turn relative to plate 15 around the axis of shank 10 of bolt 8.

*Separating leg L and bolt 8 from plate 15*

In the abovementioned assembly, it is impossible to gain access to the end key-head 11, because this is located interiorly of plate 15, within the body of the doll.

The leg L is pulled away from plate 15, while the end-lugs 14a remain seated in recesses 7a of plate 15, until the intermediate lugs 14 abut the washer W. The leg L is also turned relative to the axis of the shank 10, until the intermediate lugs 14 are alined with the key-slots 6 of washer W, and said intermediate lugs 14 are passed through the key-slots 6, and the leg L is then turned around the axis of shank 10, until the intermediate lugs 14 are again seated in the recesses 7 of washer W, said recesses 7 being proximate to plate 15. After this has been done, the leg L and bolt 8 are now turnable in unison relative to plate 15, around the axis of shank 10. The seating fit between the intermediate lugs 14 and their respective recesses 7, is closer than the seating fit between the end-lugs 14a and their respective recesses 7a.

Hence the leg L and the bolt 8 can be turned in unison around the axis of shank 10, in order to unseat the end-lugs 14a from their recesses 7a, and to aline the end-lugs 14 with their respective key-slots 6a, so that a pull on leg L will pass the end-lugs 14a through their respective key-slots 6a, thus detaching the leg L from plate 15, while the intermediate lugs 14a remain seated in their recesses 7, thus maintaining the intermediate key-head 12 at the outer face of washer W, as in the original sub-assembly.

FIG. 3

This shows the connection of an arm A to the body B of a doll. In this cause, an auxiliary body-plate or rigid washer WA, also made of metal or other suitable material, is rigidly fixed to the body B. This body-plate or washer WA has the abovementioned key-slots 6a and recesses 7a so that the washer WA corresponds in function to the body-plate 15. The washers W and WA are identical. The body B is also originally made of vertical halves, as above noted, so that it can be assembled with washer WA. Normally the inner end of arm A frictionally abuts the body.

FIG. 4

In this embodiment, the body member BB can be a rigid body-plate which may be part of a chassis of a toy or other article, and the member T may be a turret or other relatively-turnable member. The turret T has an end-wall or coupling plate 17 which has the abovementioned key-slots 6 and recesses 7. The body member or body plate BB has the above mentioned key-slots 6a and recesses 7a.

The assembly and separation and operation of the embodiments of Figs. 3 and 4 is as previously described. Fig. 4 shows a slight clearance between body member BB and turret T, for convenience of illustration.

In Fig. 4, the end-wall 17 may be slightly separated from body-member BB in the final assembly, so that the member T is not frictionally engaged with body-member BB.

While I have described a preferred embodiment in which I provide two lugs 14 and two lugs 14a, I can embody the invention in a construction which has only one such lug in each key-head, or in which each key-head has more than two lugs. In such case, the number of recesses is correspondingly varied. Hence, when I refer in any claim to two lugs and two recesses, this includes a device which has at least one lug in each key-head. The lugs and recesses exemplify releasable engaging means, which may be varied. Hence, whenever I refer to lugs and recesses in any claim, I include equivalent means. The invention includes the improved coupling as a subcombination of the assembly.

It is noted that the coupling plate or washer W and the member 8 are turnable relative to each other when the intermediate head 12 and the abutment-head 9 are on the same side of said coupling plate washer W, as illustrated in Fig. 1, and when the intermediate head 12 and the abutment member 9 are on the same side of the coupling plate or wall 17.

The bolt 8 is designated as a pivot member, because the auxiliary member L or A or T is turnable relative to bolt 8 in the final assembly.

I claim:

1. A coupling which includes a rigid coupling plate which has a bore, said bore having two key-slot extensions located along a respective straight line, said rigid coupling plate having two recesses located along another straight line, said bore being located between said key-slots and between said recesses, a pivot member which extends turnably through said bore of said coupling plate, said pivot member having a shank which has an abutment-head, a compression spring mounted on said shank, one end of said compression spring abutting said rigid coupling plate, the other end of said compression spring abutting said abutment-head, said pivot member having an end key-head at its end which is opposed to said abutment-head, said pivot member also having an intermediate key-head which is located intermediate said end key-head and said abutment-head, each of said key-heads having a pair of lateral lugs which are shaped to pass through said key-slots of said coupling plate, the lugs of said intermediate key-head being shaped to fit in said recesses of said coupling plate, said recesses being in a face of said coupling plate which is proximate to said end key-head when the lugs of said intermediate key-head are seated in said recesses of said coupling plate.

2. A combination with the coupling of claim 1, a body member and an auxiliary member, said rigid coupling plate being rigidly fixed to said auxiliary member, said body member having a coupled body-plate which is rigidly fixed to said body member, said body-plate having a body-plate-bore which has body-plate key-slots located along a respective straight line of said body-plate and also having body-plate recesses located along another straight line of said body-plate, said body-plate-bore being located between said key-slots and between said recesses of said body-plate, the lateral lugs of said end key-head being shaped to pass through said body-plate key-slots and to fit in said body-plate recesses, said intermediate key-head and said abutment-head being located at the same side of said rigid coupling-plate, said lateral lugs of said end key-head being seated in said body-plate recesses of said coupled plate, said spring being under compression, said auxiliary member being turnable relative to said pivot member and relative to said coupled body-plate, said spring being under compression and normally maintaining the lugs of said end key-head seated in the recesses of said body-plate, said pivot member having a shank which is turnable in the bore of said coupled body-plate.

3. A combination according to claim 2, in which the lugs of said intermediate key-head have a closer seating fit in the said recesses of said coupling plate than the seating fit of the lugs of said end key-head in said recesses of said coupled body-plate, said pivot-member being turnable in unison with said auxiliary member to unseat the lugs of said end key-head from the said recesses of said coupled body-plate when the lugs of said intermediate key-head are seated in said recesses of said coupling plate.

4. A combination according to claim 2, in which the body member is a doll-body and auxiliary member is the limb of said doll-body.

5. A combination according to claim 2, in which the body-member is a doll-body, the auxiliary member is a leg of said doll-body, and said coupled body-plate is of angular shape, said angular coupled body-plate being pivotally connected at its bottom to a second body plate which is fixed to a third body-plate which is fixed to said doll-body in the interior of said doll-body, said third body-plate having a transverse slot, said angular coupled body-plate having an extension which extends movably through said slot.

References Cited in the file of this patent

UNITED STATES PATENTS

| | | |
|---|---|---|
| 1,939,677 | Epstein | Dec. 19, 1933 |
| 2,487,329 | Gerry | Nov. 8, 1949 |
| 2,535,116 | Beebe | Dec. 26, 1950 |
| 2,689,431 | Beebe | Sept. 27, 1954 |
| 2,736,135 | Gardel et al. | Feb. 28, 1956 |

FOREIGN PATENTS

| | | |
|---|---|---|
| 408,797 | Germany | Nov. 23, 1920 |